United States Patent
Tabaaloute

(10) Patent No.: US 9,300,521 B2
(45) Date of Patent: *Mar. 29, 2016

(54) NETWORK DEVICE AND METHOD OF TRANSMITTING CONTENT FROM A FIRST NETWORK DEVICE TO A SECOND NETWORK DEVICE

(75) Inventor: Zahra Tabaaloute, Southampton (GB)

(73) Assignee: Quotainne Enterprises LLC, Wilmington, DE (US)

( * ) Notice: Subject to any disclaimer, the term of this patent is extended or adjusted under 35 U.S.C. 154(b) by 875 days.

This patent is subject to a terminal disclaimer.

(21) Appl. No.: 13/438,667

(22) Filed: Apr. 3, 2012

(65) Prior Publication Data

US 2012/0198504 A1    Aug. 2, 2012

Related U.S. Application Data

(63) Continuation of application No. 12/664,964, filed as application No. PCT/IB2008/052439 on Jun. 20, 2008, now Pat. No. 8,175,517.

(30) Foreign Application Priority Data

Jun. 22, 2007 (EP) .................................... 07110843
Jan. 7, 2008 (EP) .................................... 08100159

(51) Int. Cl.
*H04H 60/09* (2008.01)
*H04L 29/12* (2006.01)
*H04L 12/28* (2006.01)
*H04L 29/06* (2006.01)

(52) U.S. Cl.
CPC ........ *H04L 29/12113* (2013.01); *H04L 12/282* (2013.01); *H04L 12/2809* (2013.01); *H04L 61/1541* (2013.01); *H04L 65/1083* (2013.01)

(58) Field of Classification Search
USPC ............ 455/3.01, 3.03, 3.04, 3.05, 3.06, 500, 455/502, 41.1, 41.2, 556.1, 556.2, 557, 558, 455/414.1–414.3, 418–420; 340/539.1, 340/539.11, 539.16, 539.17, 572.1, 572.4, 340/568.1, 568.5, 568.8
See application file for complete search history.

(56) References Cited

U.S. PATENT DOCUMENTS

| | | | |
|---|---|---|---|
| 6,957,776 B1* | 10/2005 | Ng ................................ | 235/474 |
| 7,177,594 B2* | 2/2007 | Burr ............................ | 455/41.2 |
| 7,373,109 B2* | 5/2008 | Pohja et al. .................. | 455/41.2 |
| 7,541,930 B2* | 6/2009 | Saarisalo et al. ............ | 340/572.7 |
| 7,949,373 B2* | 5/2011 | Whiting ........................ | 455/557 |
| 2004/0044723 A1 | 3/2004 | Bell et al. | |
| 2006/0136379 A1* | 6/2006 | Marino et al. .................... | 707/3 |
| 2006/0149811 A1 | 7/2006 | Bennett et al. | |

FOREIGN PATENT DOCUMENTS

JP     2001-28744     2/2001

OTHER PUBLICATIONS

Ceiva Digital Photo Frame; Owners Guide LF4007 and LF4008; pp. 1-36.

(Continued)

*Primary Examiner* — Tuan A Tran

(57) ABSTRACT

The invention relates to a first network device outputting content, the first network device retrieving an address of a second network device using a contactless interface from a third device, and the first network device transmitting the content, which was output at the time of retrieving said address, to the second network device.

12 Claims, 4 Drawing Sheets

(56) References Cited

OTHER PUBLICATIONS

Daniel's NFC Development Weblog; Jan. 25, 2007; Nokia 6131; pp. 1-2; Retrieved Jun. 15, 2007 from http://www.nfc-development.org/2007/01/nokia-6131-nfc-showed-off-at-ces.html.

NXP; "Unlocking the Potential of Near Field Communication";16 pages; (Sep. 2006).

Leichtenstern, Karin, et al; "Mobile Interation in Smart Environments"; Intelligent Inhabited Environment Group, University of Essex; pp. 1-5.

* cited by examiner

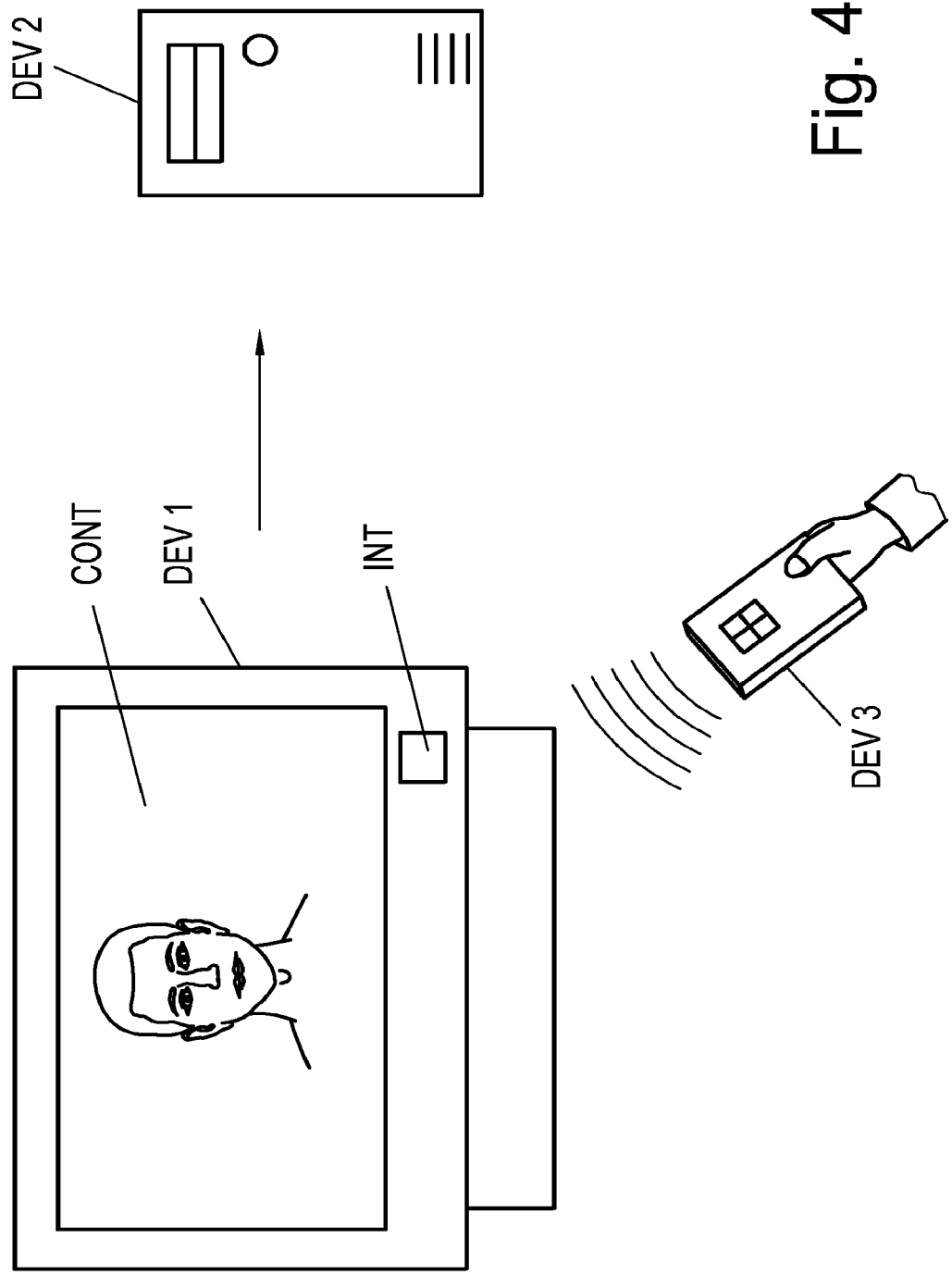

NETWORK DEVICE AND METHOD OF TRANSMITTING CONTENT FROM A FIRST NETWORK DEVICE TO A SECOND NETWORK DEVICE

This application is a Continuation of U.S. application Ser. No. 12/664,964 filed on Dec. 16, 2009, entitled "Network device and method of transmitting content from a first network device to a second network device" which claims priority to EP Application No. 07110843.5 filed on Jun. 22, 2007, EP Application No. 08100159.6 filed on Jan. 7, 2008 and PCT Application IB2008/052439 filed on Jun. 20, 2008.

BACKGROUND OF THE INVENTION

Transmitting content between network devices is a common task in various applications. The network devices can be mobile communication devices, computers, peripheral devices, PDAs, photo cameras, multimedia devices, etc.

A Digital Picture Frame (DPF) is a multimedia device that can display digital pictures. The digital picture frame usually has support for mass storage interfaces such as USB, SD/MMC and Compact Flash. It can also provide some internal storage. Some versions also have support for Ethernet, WIFI and Bluetooth. Pictures are usually displayed in a slideshow. Some digital picture frame platforms play movie clips and MP3s. Digital picture frames have become increasingly popular because of the widespread use of digital photos that usually do not get printed any more. As the digital picture frame becomes a more popular multimedia device, suggestions have been made to integrate additional communication interfaces in the digital picture frame, e.g. a GPRS module in order to transfer pictures from the Internet.

Another possibility for transferring data is Near Field Communication (NFC), which is a short-range wireless technology with speeds up to 424 kbit/s. The communication mode can be peer-to-peer read/write or Tag reader/writer mode. When an NFC enabled device touches another peer or a Tag, a data transfer occurs. NFC is mainly intended for light data transfer and data transmission can be secured. All leading mobile technology manufacturers support this technology as it provides an intuitive and simple solution for many applications. These applications range from URL transfer, digital rights transfer, access control and ticketing, payment etc.

OBJECT AND SUMMARY OF THE INVENTION

Our experience of sharing content (pictures, music, videos) from multimedia devices with friends, colleagues or relatives usually takes many steps: selecting the file, choosing the destination and sending it; or if a mass storage device is being used, removing the mass storage device, mounting it elsewhere and copying the data. In all cases, the operation of the multimedia device is interrupted in order to make the transfer.

For example when a digital picture frame is running a slide show, it has to be stopped; when a user is playing a game on his phone (while listening to some music track), he has to interrupt his game to transfer the data (music track).

Like any other multimedia device, the digital picture frame will see its functionalities extended to the maximum. With more connectivity (WIFI, Bluetooth and GPRS) and more features (multiple themes, multiple picture archives, multiple user profiles, etc), the digital picture frame could benefit from a more intuitive user interaction. Control buttons and remote controls will not be able to provide the flexibility and the simplicity needed to deal with all the features.

Technologies such as NFC and Bluetooth were recently deployed to advertise venues and special events; for example NFC posters were used to allow the user to get the URL of the venue on their mobile phones. However, posters and screens have been used with static contents so far. It would be advantageous if shoppers could get an electronic form of multiple products showing on a digital picture frame or a Set Top Box.

Therefore, it is an object of the invention to provide a method and a device for transmitting content from a first network device to a second network device, which provides a maximum of simplicity and involves a minimum of handling effort. Transmitting content should be possible during playback of the same.

The object of the invention is achieved by a method comprising the steps of a first network device playing back content, the first network device retrieving an address of a second network device from a third device, and the first network device transmitting said content, which was played back at the time of retrieving said address, to said second network device.

The object of the invention is furthermore achieved by a network device, comprising means for playing back content, means for retrieving an address of a second network device from a third device, and means for transmitting said content, which was played back at the time of retrieving said address, to said second network device.

Thus, according to the invention, for transmitting content from the first network device to the second network device, it is just necessary to have the first network device retrieving the address of the second network device from a third device. Retrieving the address is effected during playback of the content, whereby the content to be transmitted is selected to be the content that was played back at the time the address of the second network device was retrieved from the third device. As a result, the invention provides a simple way of transmitting content that is being played back on a network device at a given time.

According to a preferred embodiment of the invention, said content to be transmitted is one of a picture, a music track, a video clip or a movie, or a text.

Accordingly, the first network device can be one of a digital picture frame, a MP3 player, a stereo or Dolby surround device, a TV set, a DVD recorder, a satellite receiver, a digital book, a mobile phone, or a PDA.

For easier handling the third device, which is being used for providing the address of the second network device to the first network device, should be a portable device. Therefore, according to a preferred embodiment of the invention, said third device is a smart card or a mobile phone.

A further advantage is achieved when said first network device retrieves said address via a contactless interface.

In one embodiment the invention consists of integrating an interface working according the standard for Near Field Communication (NFC) to the first network device, such as a digital picture frame (DPF). This allows other NFC enabled devices or tags to interact with the digital picture frame in order to trigger actions in a more intuitive way. With a single touch, commands can be sent to the digital picture frame in order to execute specific actions. These actions can be a behaviour change of the digital picture frame or 'get content' from the digital picture frame. Behaviour change consists of changing some settings of the digital picture frame, such as, e.g., switching between different themes, different user profiles or different picture archives. 'Get content' consists of transferring the picture on display to a specific destination (the second network device) without interrupting the function of the digital picture frame. The NFC link is used to provide the desired destination to the digital picture frame and to trigger the picture transfer. This method can be generalised to any other multimedia device having a communication link and to other types of content such as music and videos.

According to a preferred embodiment of the invention said first network device transmits said content to said second network device via a communication link having a maximum transfer rate being higher than the transfer rate of said contactless interface for retrieving said address. Thus, the content transfer is done through a faster link than the address retrieval. In this way, each communication link is specially adapted to the respective requirements. The content transfer can be done through a faster link such as WIFI, GPRS or Bluetooth, whereas the address retrieval can be done via a NFC link.

BRIEF DESCRIPTION OF THE DRAWINGS

The invention will be described in greater detail hereinafter, by way of non-limiting examples, with reference to the embodiments shown in the drawings.

FIG. 4 shows another arrangement for data transfer between a digital picture frame and a network device.

DETAILED DESCRIPTION OF HOW TO BUILD AND USE THE INVENTION

Figure 1:
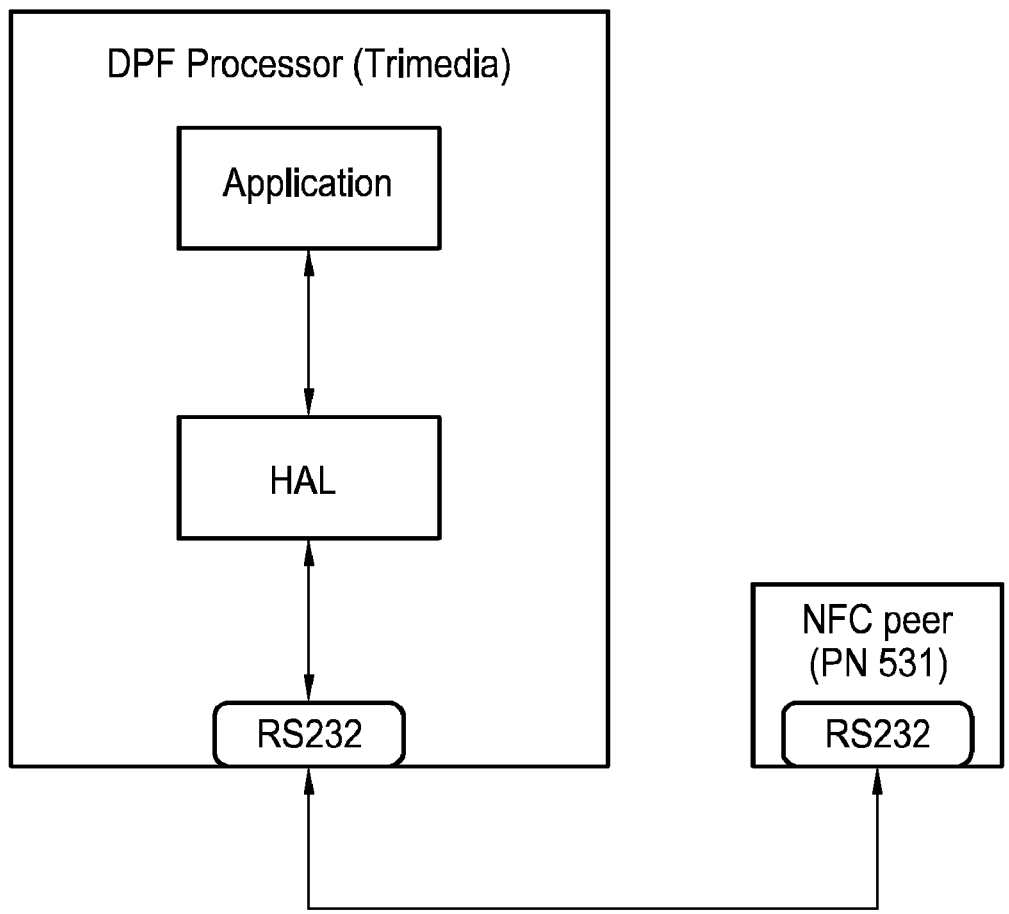
FIG. 1 shows an integration of NFC on a network device, such as a digital picture frame.

FIG. 1 shows an integration of NFC on a digital picture frame DPF. It shows only the NFC related parts and does not show other interfaces and libraries on the digital picture frame DPF processor. An NFC device allowing peer-to-peer and card reader/writer modes can be integrated to the digital picture frame DPF through an RS232 interface. An NFC Hardware Abstraction Layer HAL is already available for Windows and Linux based platforms and can easily be ported to other operating systems (for example pSOS for TRIMEDIA).

Figure 2:
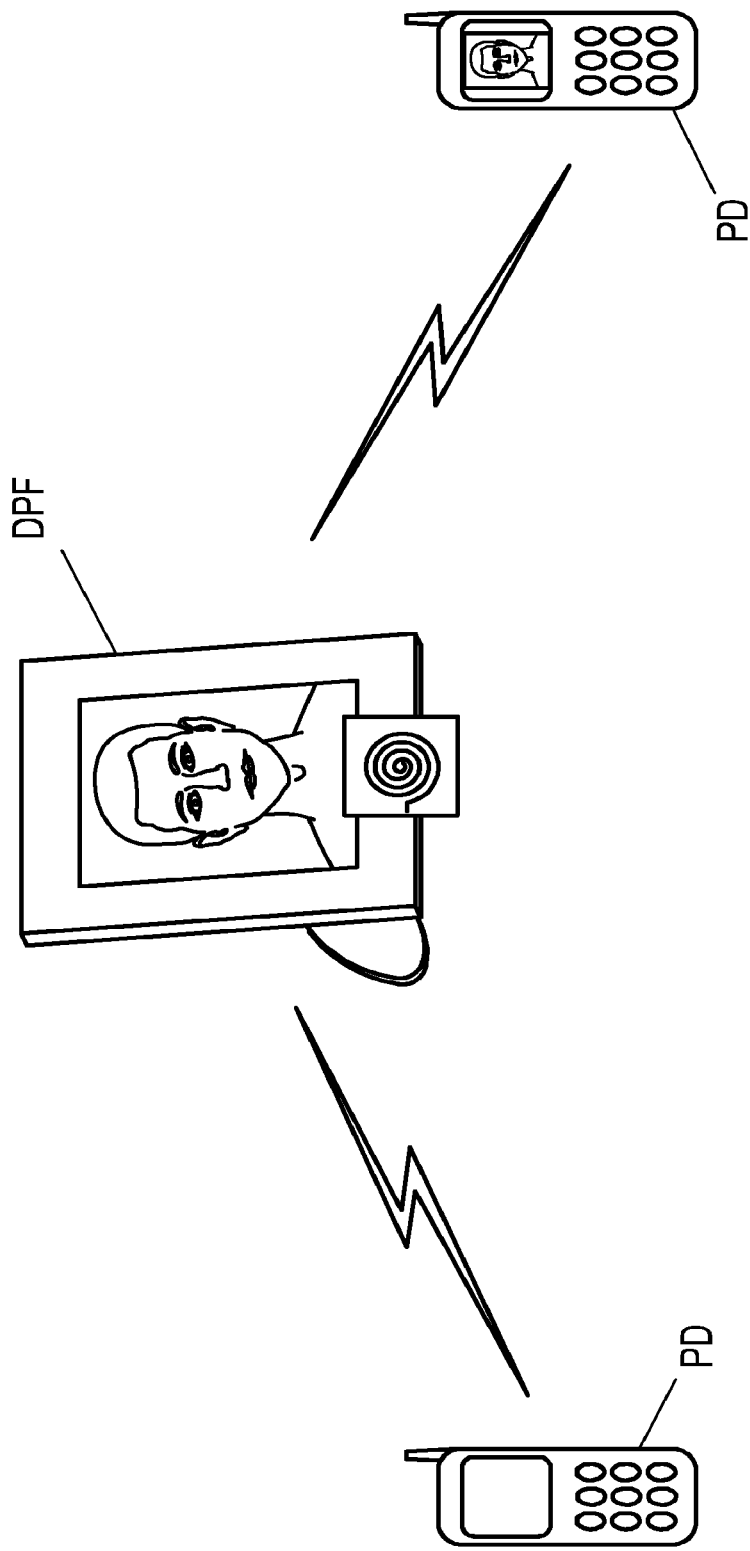
FIG. 2 shows an arrangement for data transfer between a digital picture frame and a portable multimedia device triggered by a NFC enabled device.

FIG. 2 shows how to get on-display content from a digital picture frame DPF to a nearby portable multimedia device. In this case, an NFC enabled digital picture frame DPF is showing pictures; one of the viewers is interested in the picture on display and wants to have a copy of it. The viewer touches the digital picture frame DPF with the portable device PD at the indicated area for an NFC transfer. The digital picture frame DPF gets the identifier of the portable device PD (IP address, phone number, Bluetooth device identifier) and sends back a response. The response can be a success message only or can carry in addition a thumbnail of the picture to be transferred. The digital picture frame DPF starts sending the picture to the phone PD via WIFI, GPRS or Bluetooth. The picture is displayed on the portable device when the download is completed.

Figure 3:
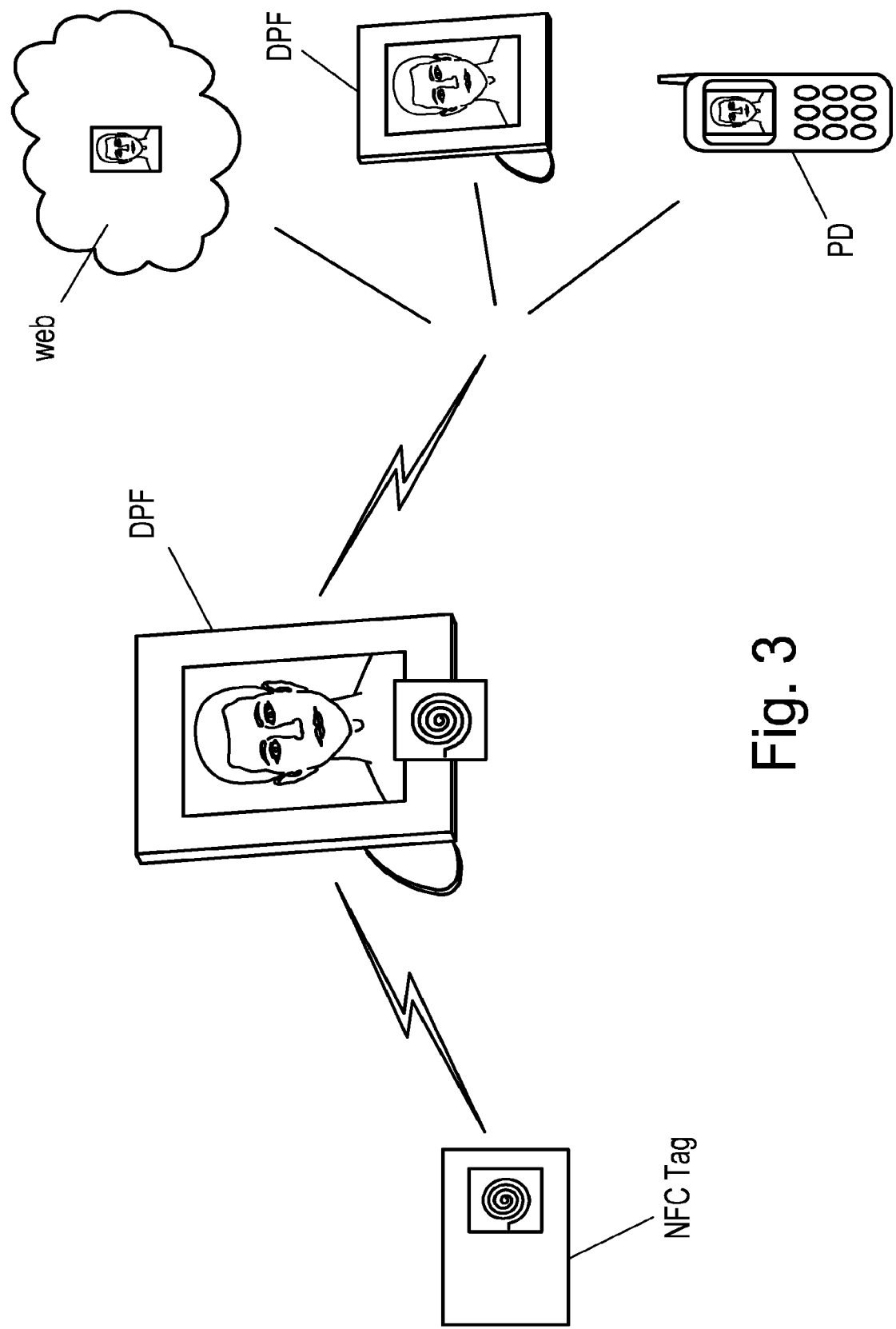
FIG. 3 shows an arrangement for data transfer between a digital picture frame and a network device triggered by a NFC tag.

FIG. 3 shows how to get a picture 'on the fly' from an NFC enabled digital picture frame DPF, i.e. the transfer of on-display content from a digital picture frame DPF to a specific destination (third party multimedia device or website) via an NFC Tag. In this case, an NFC Tag (e.g. MIFARE card) containing the destination information (URL or phone number) can be used to trigger the transfer of the picture showing. The destination it not necessarily a nearby device, it can also be a remote portable device, digital picture frame etc. It does not have to be a multimedia device, it can also be a server or a website. The selected picture is then transferred to the destination device either immediately or at a predetermined timeslot. Another NFC enabled device (phone) can be used instead of an NFC Tag.

The base idea for use case scenarios described in FIGS. 2 and 3 is that the command (short message) is sent via a slow intuitive interface while the content (large message) is sent via a high-speed interface. These use cases assume that:

The digital picture frame has a fast wireless interface such as WIFI, GPRS or Bluetooth.

The digital picture frame automatically connects to the wireless link once in the field.

The digital picture frame automatically stores the reference (ID) of the picture on display when an NFC device has been detected. The digital picture frame may be configured to offer multiple picture selection.

The NFC transfer has a high priority in order to ensure that the correct picture is selected in case of a slideshow for example.

A key based authentication can be introduced at the NFC level for a restricted access to the content download.

FIG. 4 shows a first network device DEV1 designed as a digital picture frame in another embodiment. The digital picture frame DEV1 has stored some pictures, which are shown one after another in a predefined sequence. The picture actually shown is referred to as content CONT hereinafter. In one point in time, a user passes by the digital picture frame DEV1 and is attracted by the content CONT shown. He decides that he wants to have this content CONT on his personal computer at home, which is the second network device DEV2 in this embodiment. Hence, he presents a smart card, which is the third device DEV3 in this embodiment, to the digital picture frame DEV1. On the smart card DEV3 the address ADDR of his personal computer DEV2 is stored. Subsequently, the address ADDR is transmitted from the smart card DEV3 to the digital picture frame DEV1 via a contactless interface INT, which is built into the digital picture frame DEV1. The contactless interface INT is an interface working according the Near Field Communication standard, NFC standard for short, in this embodiment. In a next step the digital picture frame DEV1 evaluates which of the stored pictures is currently shown, which is basically the content CONT. Finally, the content CONT is transmitted to the address ADDR and stored in the personal computer DEV2. This can be achieved via wired networks such as the Internet or wireless networks such as WLAN networks or GSM networks.

In a preferred embodiment, the second network device DEV2 is a server of a picture service. In that case, content CONT (i.e. pictures) are simply uploaded to a user's personal storage area on this server and/or print out on paper and sent to the home address of the user. In this context, it is advantageous if the third network device DEV3 is a loyalty card of said picture service. So, provided the user is owner of such a loyalty card (here embodied as contactless smart card), he can get printouts from digital picture frame, which he passes by, in a very simple and intuitive way. If music or videos are provided as content CONT, upload to a personal storage area on a web server and/or burning and delivering CDs or DVDs is imaginable in a similar way.

In another embodiment DPF configuration is done using an NFC tag. With multiple picture archives and multiple feeds (servers, websites) to the digital picture frame, an NFC tag can be used to easily switch from one set of pictures to another. The tag provides the location (local path or URL) of pictures to start playing. The pictures can be stored locally on the digital picture frame or can be downloadable from an external feed. The digital picture frame can also feature a multiple user option; each user will have a personal profile, a personal set of pictures, a personal theme, personal slideshow settings etc. A user can identify with the digital picture frame using an NFC tag or his NFC enabled mobile phones. With a simple touch, a different user can load his personal profile on the digital picture frame and see his pictures showing.

It should be noted that the intuitive 'get content' method also applies to other content formats such as videos, music or any other files; it can also apply to other types of multimedia devices such as mobile phone, Set Top Boxes etc. The multimedia device playing the content does not have to support NFC. Although NFC is the most intuitive way of triggering the get content action on a multimedia device, other methods such as Bluetooth or WIFI or GPRS can be used to trigger the transfer. Or it can even be set manually simply by pausing the multimedia device.

In another embodiment the first network device DEV1 is designed as a device playing back sound such as, e.g., a HiFi set, a music player or a loudspeaker. The device has two communication interfaces, one being designed as contactless interface for retrieving an address of a second network device from a third network device, such as a mobile phone, and the other being designed for establishing a fast data link for transmitting the music file being played back to a second network device DEV2, such as, e.g., a portable music player or a computer.

In the case of contact-less interfaces, the content playing on the multimedia device might change between the time where the user issues a get content request and the time where the request is received. One way around this problem is to check the timestamp of the request and work out which content was playing at that time. The multimedia devices communicating have to be synchronised. The synchronisation can occur just after the devices were detected in the field. Each multimedia device can have an associated website mirroring its content. The content transfer in this case can occur between websites.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprise" and its conjugations do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method comprising:
   a first network device playing back content;
   the first network device retrieving, via a contactless interface operating according to the standard for Near Field Communication, an address of a second network device from a third device; and
   the first network device transmitting said content, which was played back at the time of retrieving said address, to said second network device.

2. The method according to claim 1, wherein said content is one of a picture, a music track, a video clip or a movie, or a text.

3. The method according to claim 1, wherein said first network device is one of a digital picture frame, a MP3 player, a stereo or Dolby surround device, a television set, a DVD recorder, a satellite receiver, a digital book, a mobile phone, or a Personal Digital Assistant (PDA).

4. The method according to claim 1, wherein said third network device is either a smart card or a mobile phone.

5. The method according to claim 1, further comprising: storing said content on said first network device.

6. The method according to claim 1, further comprising: transmitting said content to said second network device via a communication link having a maximum transfer rate higher than the transfer rate of said contactless interface for retrieving said address.

7. A first network device, comprising:
   device configured to play back content;
   a contactless interface, operating according to the standard for Near Field Communication, for retrieving an address of a second network device from a third network device, and
   a device configured to transmit said content, which was played back at the time of retrieving said address, to said second network device.

8. The first network device according to claim 7, wherein said content is one of a picture, a music track, a video clip or a movie, or a text.

9. The first network device according to claim 7, designed as one of a digital picture frame, a MP3 player, a stereo or Dolby surround device, a television set, a DVD recorder, a satellite receiver, a digital book, a mobile phone, or a Personal Digital Assistant (PDA).

10. The first network device according to claim 7, further comprising:
    a device configured to store said content.

11. The first network device according to claim 7, further comprising:
    a communication interface having a maximum transfer rate higher than a transfer rate of said contactless interface for retrieving said address.

12. The first network device according to claim 7, further comprising:
    a communication link selected from a group consisting of Wi-Fi™, General Packet Radio Service (GPRS), and Bluetooth™.

* * * * *